No. 773,364. Patented October 25, 1904.

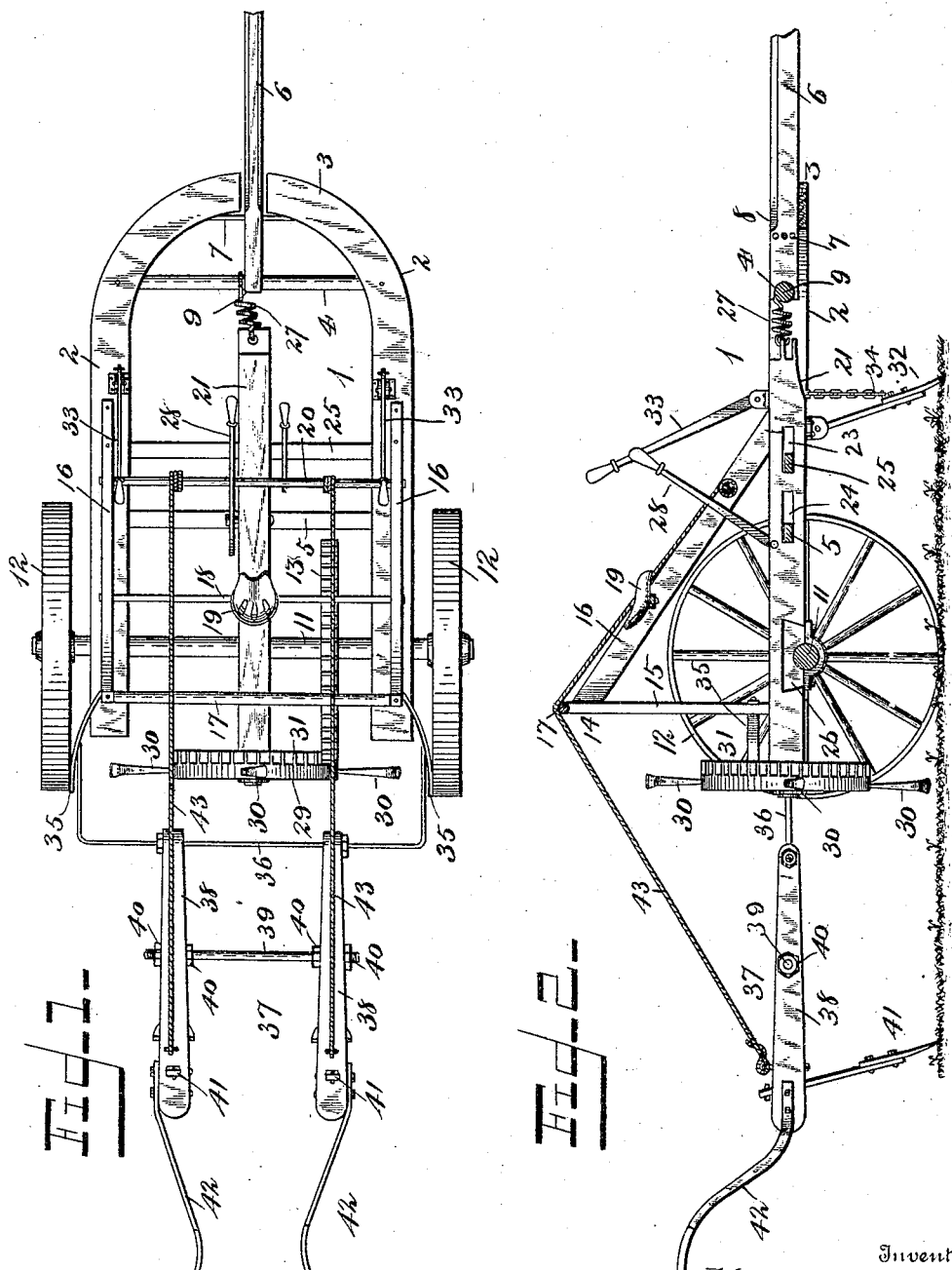

UNITED STATES PATENT OFFICE.

HOPKIN T. ANDERSON, OF MARIETTA, MISSISSIPPI.

COTTON-CHOPPER.

SPECIFICATION forming part of Letters Patent No. 773,364, dated October 25, 1904.

Application filed April 28, 1904. Serial No. 205,392. (No model.)

*To all whom it may concern:*

Be it known that I, HOPKIN T. ANDERSON, a citizen of the United States, residing at Marietta, in the county of Prentiss and State of Mississippi, have invented certain new and useful Improvements in Cotton-Choppers; and I do declare the following to be a full, clear, and exact description of the invention, such as will enable others skilled in the art to which it appertains to make and use the same.

My invention is an improved combined cotton chopper and cultivator; and it consists in the construction, combination, and arrangement of devices hereinafter described and claimed.

The object of the invention is to provide a cheap, simple, strong, durable, and efficient machine of this character which may be used either for chopping a crop—such as cotton—or for cultivating the same or for both chopping and cultivating at the same time.

In the accompanying drawings, Figure 1 is a top plan view of my improved combined chopper and cultivator. Fig. 2 is a side elevation of the same, partly in section, on the line *a a* of Fig. 1.

The main frame 1 is here shown as comprising a pair of side beams 2, which have their front ends bent inwardly toward each other, as at 3. The side beams are connected together by cross-bars 4 5, which are disposed at a suitable distance apart.

A draft-tongue 6 is pivoted between the front ends of the beams 2 by a bolt or pin 7, which may be set in either of a series of adjusting-openings 8, with which the draft-tongue is provided, so as to set the tongue at any desired angle, and hence regulate the draft of the machine. The rear end of the tongue is notched, as at 9, to enable it to engage the cross-bar 4, and hence secure the tongue at any desired adjustment.

A shaft 11 is journaled in suitable bearings near the rear ends of the beams 2 and is provided with ground-wheels 12, which rotate the said shaft as the machine moves along. On the said shaft is a spur-gear 13.

A frame 14 rises from the rear end of the main frame 1 and comprises standards 15, longitudinally-inclined bars 16, a cross-bar 17 at the upper ends of the standards, and a cross-bar 18, which connects the inclined bars 16 together and carries the seat 19. A winch 20 is journaled in bearings in the inclined bars 16 and may be turned by any suitable devices.

A longitudinally-movable bar 21, which is disposed midway between the sides of the frame 1, is provided with longitudinal transversely-disposed slots 23 24. Through the same extend the cross-bar 5 and a similar cross-bar 25, said cross-bars serving to support said longitudinally-movable bar and the slots enabling the latter to be longitudinally adjusted. The said bar 21 is here shown as provided on its under side, at a suitable distance from its rear end, with a longitudinal notch or recess 26 to clear the shaft 11. A spring 27 is connected to a longitudinally-movable bar 21 and serves to draw the same forward. The said spring is here shown as a coiled retractile spring having its ends connected to the bar 21 and to the cross-bar 4. A lever 28 is pivotally connected to bar 21, and its lower end bears against the cross-bar 5. By means of the said lever the bar 21 may be moved rearwardly against the tension of the spring. On the rear end of the said bar is mounted a revoluble chopping-wheel 29, which is provided with a suitable number of chopping-hoes 30, that project readily therefrom and are appropriately spaced apart. On the front side of the said chopping-wheel is a crown-gear 31, which may be moved into or out of engagement with the gear 13 by the longitudinally-movable bar 21, spring 27, and lever 28, as will be readily understood. It will be further understood that when the gear 31 is in engagement with the gear 13 the chopping-wheel will be rotated, and if the machine is driven astride of a row of plants the chopping-wheel will serve to chop the same and reduce them to "stands." By employing a suitable number of chopping-hoes at the required distance apart the stands may be spaced as required.

Cultivator-feet 32 are pivotally connected to the beams 2 of the frame 1 and depend therefrom. The said cultivator-feet may be raised or lowered to approximately adjust them and to also throw them into or out of engagement with the soil, as may be desired.

Levers 33 are here shown, which are mounted on the side beams 2 and are connected to the cultivator-feet, as at 34, the function of the said levers, as will be understood, being to raise or lower the said cultivating-feet. The standards 15 are provided with scrapers 35, which act on the wheels 12 to prevent loose soil from adhering thereto.

A draft-bail 36 is pivotally connected to the rear ends of the beams 2. The cultivator attachment 37 is pivotally connected to the said draft-bail and is drawn by the same in rear of the chopping-machine. The beams 38 of said cultivator-frame have their front ends pivotally connected to the draft-bail, and the said beams are adjustable laterally thereon. Said beams 38 are further connected together by a cross-rod 39, which is screw-threaded and provided with adjusting-nuts 40, which engage opposite sides of the beams 38 and are employed in connection with the adjusting and connecting rod or screw 39 to adjust the said beams laterally as may be required. The said beams carry cultivator-feet 41, of any suitable construction, and are provided with handles 42, whereby they may be operated by a person walking in rear of the machine. The winch is connected to the cultivator-frame by ropes or chains or other suitable flexible connecting elements 43. By means of the same and the winch the cultivator may be raised or lowered, as desired.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

A chopper having a main frame provided with cross-bars, an axle-shaft having its bearings in the main frame and provided with ground-wheels and a spur-gear, a non-revoluble, longitudinally-movable bar having slots through which the cross-bars extend, a spring to move said bar forwardly, a lever carried by said bar and coacting with one of the cross-bars, to move said longitudinally-movable bar rearwardly against the tension of said spring, and a revoluble chopper mounted at the rear end of the longitudinally-movable bar and having a gear engaged by the forward movement of said bar with the first-mentioned gear, substantially as described.

In testimony whereof I have hereunto set my hand in presence of two subscribing witnesses.

H. T. ANDERSON.

Witnesses:
E. W. WALTON,
MATTIE McCULLAR.